Aug. 9, 1966   H. DOEVENSPECK   3,265,605
PROCESS AND APPARATUS FOR CHANGING THE CHARGE OF PARTICLES
Filed Jan. 30, 1961   2 Sheets-Sheet 1
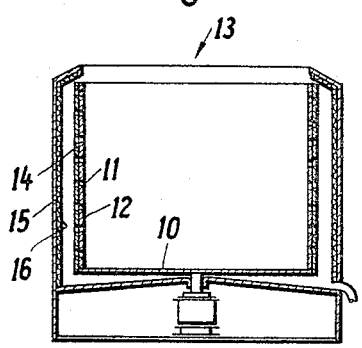
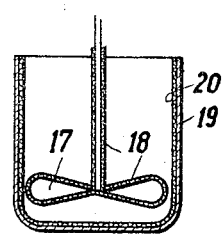
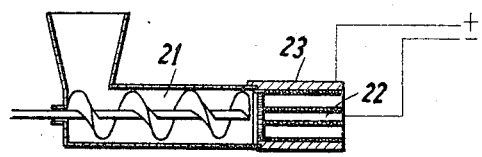
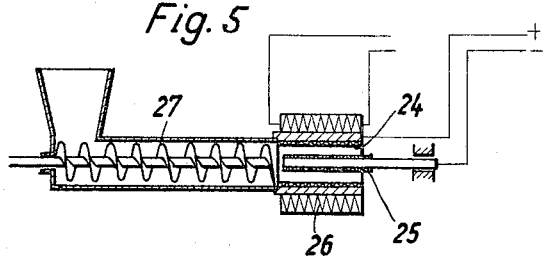
Inventor:
Heinz Doevenspeck
by Richards & Geier
ATTORNEYS Aug. 9, 1966   H. DOEVENSPECK   3,265,605
PROCESS AND APPARATUS FOR CHANGING THE CHARGE OF PARTICLES
Filed Jan. 30, 1961   2 Sheets-Sheet 2
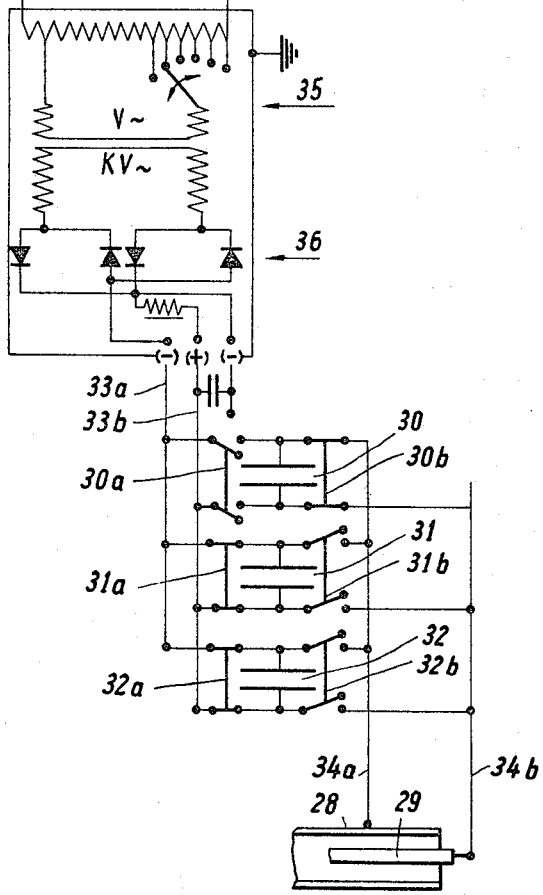
Inventor:
Heinz Doevenspeck
By
Richards & Geier
ATTORNEYS

United States Patent Office 3,265,605
Patented August 9, 1966

3,265,605
PROCESS AND APPARATUS FOR CHANGING
THE CHARGE OF PARTICLES
Heinz Doevenspeck, Bremen, Germany, assignor to
Gesellschaft für Getreidehandel Aktiengesellschaft,
Dusseldorf, Germany, a corporation of Germany
Filed Jan. 30, 1961, Ser. No. 85,531
Claims priority, application Germany, Feb. 8, 1960,
D 32,565
4 Claims. (Cl. 204—165)

This invention relates to processes of changing the charge of dispersed systems of inorganic and/or organic origin for the purpose of utilizing the phases or their component substances; this invention further relates to apparatus for carrying out these processes.

Dispersed systems, as defined herein, are units of matter of definite form, composition and structure, the composition of which is limited by coarse dispersion, colloids and low molecular divisions.

Dispersed systems are classified in accordance with the origin of their component parts into two main groups, namely, inorganic systems and organic systems.

Inorganic systems, as far as colloids are concerned, are divided into metals, non-metals, oxides and oxide hydrates, as well as salts.

Organic systems with reference to colloids are divided into homeopolar colloids, hydroxyl-containing colloids and heteropolar colloids.

Dispersed systems of organic or inorganic origin consist of mixtures of substances the relative limits of which are fixed by their end surfaces. The individual substances are designated as phases. There are forces active at the end surfaces of the phases which are designated as surface tension. The surface tension corresponds to a negative or positive charge of the phase end surfaces and is located in the diffuse double layer of the phase. The electrical charge of the phases of a system is produced by the phase itself and may be caused by dissociation, ion adsorption and frictional electricity.

There are many ways in which a change in the charges of the phases of a system can be produced, for example, by physical and/or chemical reactions, electro-kinetic processes, such as electro-phoresis, electro-osmosis, electro-dialysis, as well as charging by electrolysis or illumination. It should be also mentioned that a change in the charge of these systems can be produced by photochemical methods.

The use of the above described processes for affecting the phases of a system is greatly limited since they are either uneconomical, or become uneconomical with the development of industry, or since they change the phases irreversibly, as happens, for example, through the application of heat during cooking, roasting, drying, etc. In addition, the use of these processes is limited by pertinent legal requirements, as is the case, for example, with chemical additions, electrolysis and the application of radiant energies.

Various processes for producing protein concentrates are also known in the art. It is customary to produce protein concentrates, for example, from fish or fish waste by boiling, pressing, drying and evaporating. It is also known to subject fish for this purpose to a chemical dissolution treatment, as well as an enzymatic and/or bacteriological treatment. Finally, protein concentrates can be obtained from fish by an ultrasonic as well as a high frequency dissolution treatment.

The drawback of all these known processes consists primarily in that only denaturated protein concentrates are produced. Thus the biocatalyst content is damaged, resulting in poor digestion when protein concentrates are added to mixed fodder. Furthermore, the essential acid complex content is also detrimentally affected, with the result that these protein concentrates have only a small growth component. Finally, the lipoids are undesirably affected by oxidation.

A further drawback of the known processes is their comparatively high costs. In chemical dissolution treatments there is also the toxic danger. Enzymatic and heat treatments have the drawback of unpleasant odor development.

An object of the present invention is the provision of a general process of changing the charge status of dispersed systems for the purpose of better utilization of the phases or their component substances, along with an adequate apparatus for carrying out the process, which will not have the drawbacks of prior art processes.

Another object is to adapt the general principles of the present invention to the treatment of the cell contents of animal and vegetable cells so as to improve economically the extraction of the raw materials contained in these cells, while preserving the tissue and natural substances contained therein.

A further object is to develop a process for producing different animal protein concentrates which can be used by themselves as a mixture, but which can be preferably used in mixture with other substances in further treatments for the purposes of the foodstuff industry, and which will not have the drawbacks of prior art processes, more particularly, which will not produce denaturated protein concentrates.

Other objects of the present invention will become apparent in the course of the following specification.

In accomplishing the objects of the present invention, it was found desirable to provide a process wherein the dispersed systems being treated are subjected to impulse-like discharging D.C. fields between preferably non-metallic electrodes.

Magnetic fields of high induction are produced by the impulse-like discharges of these D.C. fields which are preferably produced by condensers. The condensers are discharged in a very short time period oscillatingly with high frequency and/or aperiodically, whereby high current amplitudes are maintained.

Furthermore, it is advantageous to bring the dispersed systems being treated between concentrically arranged carbon electrodes, so that condenser charges of high voltage can be discharged directly through the dispersed systems. This takes place through an arrangement of suitable switch elements, preferably mercury switches.

The energy required to produce the separation effect, the steepness of the discharge curve, the frequency of the discharge, the strength of the magnetic field, as well as the number of impulses per cross-section of the system being treated—all depend upon the properties of the system and the desired results.

In accordance with a further development of the principles of the present invention, a new and advantageous process is used for the separation of animal or vegetable substances into solids, watery phase and oily phase in order to obtain component substances contained in the individual phases.

Such process may include the step of subjecting a fresh comminuted animal or vegetable material to the impulses of a D.C. field followed by a centrifuge treatment. According to another embodiment, animal or vegetable organisms carry out a translatory or rotary movement while being subjected to an electrodynamic field consisting of D.C. impulses and high frequency oscillation superposed thereon.

Thus the process of the present invention may be applied as a means for affecting the activity of cellular compounds and of enzymes, and for the extraction of substrata from vegetable material. A further development of the present invention pertains to a process of producing different animal protein concentrates capable of further treatment, which may be used by themselves, or as a mixture, or, preferably, as an admixture to other substances for the purposes of the foodstuff industry.

The invention will appear more clearly from the following detailed description when taken in connection with the accompanying drawings showing by way of example only, preferred embodiments of the inventive idea.

In the drawings:

FIGURE 1 illustrates diagrammatically and partly in section a centrifuge converted in accordance with the principles of the present invention.

FIGURE 2 illustrates diagrammatically and in section a stirrer converted in accordance with the principles of the present invention.

FIGURE 3 illustrates diagrammatically and partly in section a meat grinder converted in accordance with the principles of the present invention.

FIGURE 4 is a circuit diagram illustrating an apparatus of the present invention.

FIGURE 5 illustrates diagrammatically and partly in section another apparatus of the present invention.

The following examples are also given solely by way of exemplification and not by way of limitation:

Example 1

Undesirable foams and emulsions are developed in many processes of inorganic and organic chemistry. Such is the case, for example, with centrifuges. A centrifuge 13 illustrated in FIGURE 1 of the drawings comprises a screening drum 10 enclosed by a boiler 15 and having a sieve 12 and an auxiliary filter layer 11. The undesirable effects are caused by the charging of liquid droplets as they pass through the filter 11 and the sieve 12, due to friction.

In accordance with the present invention, layers of carbon 14 and 16 are applied to the drum 10 and the boiler 15, respectively, so that they become concentrical electrodes through which are carried out impulse-like discharges of accumulated electrical energy by suitable electrical connections (not shown). This prevents the charging by frictional electricity and produces additionally an accelerated separation by charge reversal of the capillar activity in the filter.

The same procedure is also applicable to filtration.

Example 2

FIGURE 2 shows a stirring or beating up element 17 located in a container 19.

In accordance with the present invention, the stirring element 17 is provided with a carbon coating 18. Similarly the inner surfaces of the container 19 are provided with a carbon coating 20. The two parts constitute an electrode system for producing emulsions and foam.

The electrodes discharge in an impulse-like manner an electrical field, preferably produced by charged condensers (not shown), which is specific to the material being treated and to the purpose which is to be attained, to produce the greatest possible surface tensions of the individual phases of the system. These discharges between the stirring element and the container walls facilitate to a great extent the formation of foam or emulsion (for example, for the making of whipped cream or mayonnaise), and the formations which are thus produced are to a high degree resistant against the break up of their structure due to the fact that they have received specifically higher charges.

Example 3

This example relates to the breaking up of animal material.

FIGURE 3 of the drawings illustrates a meat grinder 21.

In accordance with the present invention, the initial animal material, such as fish or meat, after being chopped up in the grinder 21, is pressed between concentrically arranged carbon electrodes 22 and 23, the grain size being preferably between 3 and 8 mm. During the passage of the material between the electrodes high voltage energies collected in condensers (not shown), are discharged through the material. The strength of the field between the electrodes amounts, preferably, to 3–6 kv./cm. During the discharge, the muscle fibers are cramped together and free the liquid contained therein. In the case of other cellular compounds, such as so-called depot cells, the surface tension of the phases of the emulsified liquids contained therein is eliminated. The cell walls become permeable due to the loss of electrical charges. The enzymes, as protein-proteid complexes, are so influenced that the lipasic enzymasis (fat reduction) is diminished to nearly one half.

It was determined experimentally that pathogenous bacteria were so affected by the above-described electrical treatment as well as subsequent treatment with centrifuges, that no toxic effects in feeding with the resulting product could be observed.

After the completion of the described impulse treatment, the material is separated in the usual self-flushing centrifuges into the following phases: oily, watery, solid.

As already stated, a new and advantageous development of the process of the present invention is its application to the separation of animal or vegetable materials into solids, aqueous phase and oily phase in order to obtain the component substances contained in the individual phases. The cell content of the vegetable and animal cells is thereby so prepared for the extraction of raw materials contained therein that, firstly, a much more economic extraction of these raw materials is possible and, secondly, the natural accompanying substances and tissue substances of the raw materials remain intact.

Under the term of materials of animal or vegetable origin, which are referred to herein, is to be understood the cellular paste produced by the mechanical comminution of recently slaughtered animals or fresh plants. Animal and vegetable cells have several common functions which are carried out in a similar manner in all cell types. For example, a common feature of all cells is the production of energy which takes place everywhere in substantially the same manner, as well as the receiving and the discharge of substances through the cell wall and the cell membrane.

The so-called "breathing" of the cell, which is biological oxidation, is carried out in the cell in such manner that it consists of a long reaction chain. The reduction is the reverse procedure. The differences in energy which then take place are so small that most of the members of this chain are reversible. The entire oxy-reduction process thus receives the character of a wave movement which is stimulated by the impulses.

In view of the above, a process constituting a further development of the present invention consists in that the fresh material is comminuted and then passed between the electrodes, while during this passage, a D.C. field is passed impulse-like through the material, this being followed by a centrifuge treatment.

When a predetermined electrical field is used, which is selected to suit the type of material—whether animal or vegetable—as far as the energy, frequency and characteristics of the field are concerned, a change in the cell content will be noted.

A comparison of the cell substances after boiling or drying with those subjected to the above described treatment according to the present invention has produced the following clearly recognizable features:

The cell wall with its membrane of electrically treated cells remains plastic and transparent, while this is not the case with dried or boiled cells. The cell wall of boiled cells does remain plastic, but the albumens are coagulated and the pores of the cell membrane are glued together. Therefore, in the electrically treated cells the remaining liquid can still pass through the wall of the cell without having to carry out a further mechanical breaking up and, furthermore, the albumens are still present in their natural form.

The extraction of basic substances from vegetable and animal raw material for the foodstuff industry and pharmaceutical purposes often involves the application of substantial heat. This use of heat is necessary so as to separate to a substantial extent the substrata contained in the vegetable or animal cells from their compounds and to diminish the total moisture content of the initial material to such an extent that it is possible to use machines for the comminution and separation of materials, or for the extraction through solvents. It is then necessary to operate with temperatures in excess of plus 80° C. Then the following changes, among others, take place in the natural condition of the cell system:

(1) Hardening of the cell wall and cell membrane.

The result is an additional energy requirement during dissolution.

(2) Coagulation of natural albumens.

The result is a diminution of physiological values.

(3) Destruction of vitamins, essential fatty acids, antioxidants, etc., at temperatures above plus 45° C.

The final results are diminished physiological food values and perishable goods. It is then necessary to add artificially the destroyed substances.

(4) In the case of fats and fatty oils, for example, the amount of free fatty acids is increased and hydrolytical splitting is facilitated.

The result is the necessity of refining with the resulting losses in quantity and quality.

In accordance with the electrical process of the present invention the material comminuted in a meat grinder is continuously pressed between two special electrodes and at the same time is subjected to electrical impulses of a predetermined character. Then the following was observed.

The size of the drops of the emulsion in the cell increases very quickly and colloidal liquid surfaces are precipitated. The same procedure was observed in an individual cell removed from the large compound. A cell which was embedded between the two electrodes and which was not damaged, gives up the hydrate while moving the membrane when subjected to an electrical field and a disemulsification of the cell liquid takes place.

The cell liquid which is thus produced and the emulsifiers of which (ampholytic proteids) have been neutralized electrically, can be separated into its components merely by the application of a centrifugal force.

Thus by means of the present invention it became possible by the use of electrical phenomena to so influence the cell content of living (vitro) cells of animal or vegetable origin, that an economically feasible purely mechanical process can be carried out for their treatment, as well as for the extraction of raw substances, without the use of thermal or chemical reactions.

The term living (vitro) cells is used herein to designate only such cells the membranes of which do not show yet any plasmolytic changes.

A further development of the present invention includes a process for treating animal and vegetable organisms in accordance with which whole or broken up organisms are subjected to an electrodynamic field during a translatory or rotary movement, whereby the field consists of D.C. impulses as well as high frequency oscillations superposed thereon.

The following devices may be advantageously used for carrying out this process of the present invention:

The organs or parts of organs of animal or vegetable nature, which have been broken up in a comminuting device or machine into parts ranging in size from about 3 to 8 mm., are pressed through a hollow body by means of a continuously or discontinuously operating pressing device. FIGURE 4 of the drawings shows an electrode 28 constituting this hollow body. In the center of this hollow electrode 28 there is a second electrode 29 which is so located that it constitutes the geometrical center for all points upon the inner surface of the hollow electrode 28, so that the same field distances exist everywhere in the electrodes 28 and 29. In order to produce steep D.C. impulses there are provided several condensers 30, 31 and 32 which are interconnected in parallel and which may be discharged one after the other through the electrodes 28 and 29 by means of discharge conduits 34a and 34b connected therewith through the use of mercury tumbler switches 30a, 30b; 31a, 31b; 32a, 32b, whereby the mercury tumbler switches disconnect the condensors 30, 31 and 32 from the conduits 33a and 33b shortly before the beginning of the discharge.

Alternating current, such as three-phase current of usual frequency and voltage is used to supply the condensers. The current is transformed by a regulating transformer 35 to a high voltage of about 6 kv. and then is changed into direct current through a rectifier device 36 in bridge connection followed by a choke coil and capacity connected therewith.

The three condensers 30, 31 and 32 which are interconnected in parallel, are so connected electrically with the material being treated through direct high voltage charging and discharging through the electrodes 28 and 29, that one condenser is always discharged through both poles, while the other condensers are being charged.

The electrodes 28 and 29 consist preferably of a carbon electrode system.

Obviously, the number of parallel connected condensers 30, 31 and 32 may be increased.

This arrangement makes possible, on the one hand, a short sequence of impulses and, on the other hand, provides the required time for the charging of the condensers.

In accordance with a somewhat different embodiment of the present invention (FIGURE 5), a spool or winding 26 is wound about a hollow body 24. The spool 26 has a resistance which is adapted to the material being treated, as well as an inductivity the electrodynamic properties of which also correspond to the material. A converter is used to provide the electrical field; the converter transforms A.C. of 40 to 60 cycles per second and 220 volts into about 6000 volts. The high voltage received from the transformer is transmitted in such manner in a parallel connection through a rectifier, preferably in bridge connection, as well as a choke coil and capacity, which may be connected in series, and through the field coil to the electrode body, that there is either the minus pole at the hollow body 24 and the plus pole at the inner electrode 25, or the connection is reversed.

A switching element or circuit breaker for producing the impulses, which is preferably located at the inlet of the current into the low voltage part of the transformer, provides the switching into the net in such manner that the switch point coincides directly or approximately with the passage of the curve of sines of the alternating voltages through the point of reversal. In this manner best possible impulse conditions are provided.

The ratio of the time during which the device is switched on to the time during which it is switched off should be preferably 0.25 second to 0.25 second to a maximum of 0.8 second to 0.8 second.

The above described electrode arrangement 24, 25 is preferably so connected to the end of a pressing device 27 that the comminuted material is pressed by the device into the hollow space between the inner walls of the hollow body 24 and the inner electrode 25. The material, during its passage between the electrodes 24 and 25, forms a conduit switching on the high voltage circuit. The material is then subjected to the above-described impulses. The material then receives the features resulting from impulse treatment, such as electrostriction, magnetostriction, electroosmosis, electrodialysis, electrophoresis and electrophoresis-convection, due to which the material is so changed that it can be subsequently conveniently separated by means of centrifuges or presses as well as filters, used either selectively or in combination.

This process of the present invention is characterized by an extensive elimination of electrolysis during treatment, as well as by a substantial prevention of heating of the material.

As compared to prior art methods, this process of the present invention has the following advantages:

It is highly economical due to small consumption of energy and small operational costs.

It produces highly valuable raw products through a sparing treatment of the initial material, whereby, for example, the raw materials remain biologically active, which is important for pharmacological purposes.

As already stated, the apparatus used to carry out the described process, provides the required current of high voltage which is transformed from alternating current, such as three phase current, by the usual transformer in a ratio of 220 volts to a maximum of 6000 volts; the current is preferably transmitted through a bridge connection with a choke coil connected to its end, as well as a capacity which may be connected in parallel, to the hollow electrode 24 on the one hand, and, on the other hand, to the inner electrode 25 concentrically mounted within the electrode 24. The current is so transmitted in impulses through the spool or winding 26 wound about the hollow electrode 24 that the material during its passage between the electrodes serves as a conduit transmitting the impulses.

The outer surfaces of the electrodes should not contain any metal but only carbon, predominantly of animal or vegetable origin.

The arrangement of the capacities, inductivities and resistances in the entire device depends upon the conducting properties of the material to be treated.

Automatic means may be provided for actuating them at will when changing the material to be treated during operation of the device.

*Example 4*

This example pertains to an increase or decrease of the activity of cellular compounds or individual cells of animal or vegetable nature.

The individual cells or cell compounds are brought along with their nutritional soil or liquid between two non-metallic electrodes, preferably carbon electrodes. Then they are subjected to a specific impulse treatment of the type hereinabove described. This treatment results in a specific increase or diminution of the activity of the individual cells or cell compounds, depending upon the arrangements.

*Example 5*

This example pertains to an increase or decrease of the activity of enzymes.

The material to be treated is brought into the above described electrode device. Then the material is subjected to a specific impulse treatment of the described type which may be so adjusted that an increase or decrease of enzyme activity may be attained, in the manner described in Example 3 in connection with a decrease in lipase activity.

*Example 6*

This example pertains to extraction of substrata from vegetable material.

The vegetable material being treated is first comminuted to an optimum grain size, but not smaller than 3 mm. Then it is treated by electro-impulses in the manner described in Example 3. The field strength ranges between 2 and 6 kv./cm. The cell walls and the intermediate cell membranes which consist of hemicellulose, lose their semi-permeability due to the impulse treatments and become permeable. The cell liquids, the phases of which were emulsified, become disemulsified. Further treatment in sludge centrifuges or sieve centrifuges produces the phases: oily, watery, and solid.

As already stated, the present invention also includes a process of producing various animal protein concentrates which are capable of further treatments and which can be used by themselves, separately or as a mixture, or as a part of a mixture containing other substances.

In accordance with this process of the present invention, the animal raw material is first comminuted and then separated at temperatures below the coagulation temperature of the protein complexes into three phase hydrates with solids representing the protein concentrates, hydrophilic protein complexes and lipoids with lipophilic protein complexes.

The particular advantage of this process is that through it natural protein concentrates are obtained, since the process is carried out without using high temperatures, particularly without exceeding temperatures over 40° C. All the effective substances and components originally contained in the animal raw material remain preserved in their natural form in the recovered protein concentrates. Thus the drawbacks of denaturated protein concentrates produced by prior art methods, are effectively avoided.

The natural protein concentrates produced by this process have further the advantage of a greater mixing capacity, for example, with mixed fodder, than the denaturated protein concentrates known in prior art. Furthermore, the process of this invention results in the dropping of production costs by about 50 percent and more.

Finally the process of the present invention does not develop any unpleasant odors.

The present invention also pertains to a process for producing an addition to mixed fodder which is characterized in that protein concentrates produced in accordance with the described process of the invention are mixed with other products, particularly by-products of flour mills and oil mills.

An investigation found the surprising effect that a proteolysis of the material results during this mixing. This makes possible the manufacture of a mixed fodder which has a high and quick digestive capacity.

Particularly effective results were obtained by the manufacture of additions to mixed fodder in accordance with the following examples:

*Example A*

After the raw material has been separated into three phases in the above described manner, the solids are mixed with by-products of flour mills, for example, rye bran, in proportions which are usually set by law. The resulting product is an addition to mixed fodder which contains feed calcium. In the course of further mixing a product is obtained which contains a substantial amount of calcium and constitutes a nutritive fodder.

*Example B*

After the raw material has been separated into three phases in the above described manner, the hydrates are mixed with hydrophilic protein complexes, for example, wheat bran, in proportions which are usually set by law. In the course of further mixing, a particularly easily digestable fodder is produced.

*Example C*

After the raw material has been separated into three phases in the above described manner, the lipoids with lipophilic protein complexes are mixed with oat bran in proportions which are usually set by law. The resulting product is a high caloried addition to mixed fodder. The mixing of this product with the mixed fodder results in an easily digestable fattening fodder.

Advantageous results are also obtained when the three phases of the raw material produced by the described process and constituting protein concentrates, are mixed individually or in combinations with rye bran or other mill by-products, such as wheat bran, soya, palm nut, oil cakes or the like, or with the mill products themselves, such as rye, oats, barley or the like, or with mixtures of grain flour products or by-products and/or oil mill products or by-products.

However, the individual phases produced in the above described manner can be also used as such for feeding and medicinal purposes for human and animal consumption.

It is apparent that the examples stated above have been given solely by way of illustration and not by way of limitation, and that they are capable of many variations and modifications within the scope of the present invention. All such variations and modifications are to be included within the scope of the present invention.

What is claimed is:

1. A process for changing the charge of an animal material to obtain protein concentrates preserved in natural form without exceeding temperatures over 40° C., said process comprising the steps of comminuting said material, moving it between concentric carbon electrodes and discharging directly thereon high voltage condenser charges in the form of impulse-like direct current fields of between 2 and 6 kv./cm. and a period of 0.25 sec. to 0.8 sec., and immediately thereafter centrifuging the material at temperatures below the coagulation temperature of protein complexes to separate it into solids, hydrates with hydrophilic protein complexes and lipoids with lipophilic protein complexes.

2. An apparatus for changing the charge of dispersed systems to obtain protein concentrates preserved in natural form without exceeding temperatures over 40° C., said apparatus comprising a hollow carbon electrode, an inner carbon electrode concentrically located within said hollow electrode and spaced therefrom, a winding upon said hollow electrode, a transformer for transforming alternating current of 220 volts to substantially 6000 volts, a rectifier connected with said transformer for transforming the alternating current into a high voltage direct current, a plurality of condensers interconnected in parallel, mercury tumbler switches, means connecting said switches with said condensers, said winding and said electrodes to cause said condensers to discharge one after the other and to switch off said condensers shortly prior to the discharge, and means connecting said rectifier with said condensers.

3. An apparatus in accordance with claim 2, wherein said rectifier consists of a bridge connection.

4. An apparatus in accordance with claim 2, wherein the means connecting said rectifier with said condensers comprise a choke coil and a capacity connected in parallel therewith.

References Cited by the Examiner

UNITED STATES PATENTS

| | | | |
|---|---|---|---|
| 930,023 | 8/1909 | Bartley | 204—186 |
| 1,162,213 | 11/1915 | Bloom | 204—186 |
| 1,326,968 | 1/1920 | Rogers | 204—186 |
| 1,565,997 | 12/1925 | Girvin | 204—188 |
| 1,930,169 | 10/1933 | Halvorson et al. | 204—167 |
| 1,949,660 | 3/1934 | Roberts | 204—305 |
| 1,959,385 | 5/1934 | Roberts | 204—188 |
| 1,978,426 | 10/1934 | Hahn | 204—188 |
| 1,978,509 | 10/1934 | Roberts | 204—188 |
| 2,337,291 | 12/1943 | Adams et al. | 204—188 |
| 2,539,074 | 1/1951 | Grove | 204—188 |
| 2,849,395 | 8/1958 | Wintermute | 204—304 |
| 3,095,359 | 6/1963 | Heller | 204—158 X |

WINSTON A. DOUGLAS, *Primary Examiner.*

JOHN H. MACK, *Examiner.*

R. E. SULLIVAN, R. L. GOOCH, B. J. OHLENDORF,
*Assistant Examiners.*